(12) United States Patent
Barrett et al.

(10) Patent No.: US 6,426,106 B1
(45) Date of Patent: Jul. 30, 2002

(54) METHOD FOR MAKING A COLD WATER SOLUBLE TEA EXTRACT

(75) Inventors: Matthew John Barrett, Sandy; Dominic P. Black, Hull, both of (GB); William Joseph Leo, Bangkok (TH); Ian Noble, Crawley; Jeffrey Bryn Richards, Northampton, both of (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/504,271

(22) Filed: Feb. 15, 2000

(30) Foreign Application Priority Data

Feb. 15, 1999 (GB) .............................................. 9903429

(51) Int. Cl.[7] .................................................. A23F 3/34
(52) U.S. Cl. ........................ 426/435; 426/597; 426/263; 426/471; 426/495
(58) Field of Search ................................ 426/597, 435, 426/263, 471, 495

(56) References Cited

U.S. PATENT DOCUMENTS

| 3,163,539 A | * | 12/1964 | Barch |
| 3,445,236 A | | 5/1969 | Gurkin |
| 3,484,246 A | | 12/1969 | Moore, Jr. et al. |
| 3,484,247 A | | 12/1969 | Graham et al. |
| 3,787,590 A | | 1/1974 | Borders et al. |
| 3,950,553 A | * | 4/1976 | Gasser et al. |
| 3,971,858 A | * | 7/1976 | Collier et al. |
| 4,156,024 A | | 5/1979 | Husaini |
| 4,680,193 A | | 7/1987 | Lunder et al. |
| 5,820,914 A | | 10/1998 | Noble et al. |
| 5,827,560 A | | 10/1998 | Fu et al. |

FOREIGN PATENT DOCUMENTS

| EP | 0 067 351 A1 | 12/1982 |
| EP | 0 067 351 | 5/1985 |
| GB | 1 284 721 | 8/1972 |
| GB | 1 311 255 | 3/1973 |
| GB | 1 461 726 | 1/1977 |

OTHER PUBLICATIONS

European Search Report dated May 29, 2001.

* cited by examiner

*Primary Examiner*—Anthony J. Weier

(57) ABSTRACT

A method for making a cold water soluble black tea extract. The method involves extracting tea solids from black tea leaves using an extraction liquid to provide a whole tea extract, oxidizing the whole tea extract under superatmospheric pressure and at a temperature above 60° C. to provide a cold water soluble liquor, cooling the cold water soluble liquor to precipitate any residual cold water insoluble material, and separating the residual cold water insoluble material from the cold water soluble liquor to give the cold water soluble black tea extract. A method for making a cold water soluble black tea powder is also described.

11 Claims, No Drawings

METHOD FOR MAKING A COLD WATER SOLUBLE TEA EXTRACT

FIELD OF THE INVENTION

This invention relates to a method for making tea products, specifically extracts and powders, that are soluble in both hot and cold water.

BACKGROUND OF THE INVENTION

Leaf tea may be prepared as green leaf tea or black leaf tea. The method of preparing such teas is well-known to those skilled in the art. Generally, to prepare black leaf tea, fresh green leaves are withered (subjected to mild drying), comminuted, fermented (in which process enzymes in the tea leaf use atmospheric oxygen to oxidise various substrates to produce brown-coloured products) and then fired (to dry the tea leaves). Green leaf tea is not exposed to the fermentation and firing processes. Partial fermentation may be used to produce intermediate-type teas known as "oolong" tea.

When hot aqueous infusions of black leaf tea are prepared, it is found that the infusion comprises substances which are insoluble in cold water, which substances therefore tend to precipitate as the infusion cools. These cold water insoluble substances comprise tannin complexes (known as tea "cream") and typically comprise from 15–35% of the total tea solids in the infusion.

Black leaf tea infusions may be used to produce "instant" teas and other products which are preferably soluble in cold water. For this reason, it is known to separate the insoluble tea cream from the "decreamed" fraction (which is the term given to the cold water soluble materials after removal of the cold water insoluble cream). This is typically accomplished by centrifugation of the chilled (3–10° C.) extract. The insoluble cream fraction represents a significant proportion of the tea solids in the infusion. Accordingly, to prevent the cream fraction (which contains desirable flavour components) going to waste, it is known to treat the cream fraction, in one of a number of ways, so as to render it soluble in cold water and then to recombine the solubilised cream with the decreamed fraction. Various treatments of the cream fraction of tea infusions are described, for example, in GB 1,311,255, GB 1,461,726, U.S. Pat. Nos. 3,787,590, 4,156,024 and 5,827,560.

In contrast, less is known about treatment of whole tea infusions, without prior separation of the cream and decreamed fractions. Whole tea infusions differ substantially in terms of chemical composition relative to the separated cream portion.

United States patent specification U.S. Pat. No. 4,680,193 (Nestlé) discloses a process in which a whole black tea infusion, containing cold water insoluble substances, is mixed with catechins in order to solubilise the insoluble material.

European patent specification EP 0,067,351 (Nestlé) describes a process for making a powdered tea extract. The process involves making two aqueous extractions of black tea leaves: one at ambient temperature using an aqueous solution of a carboxylic acid and/or salt thereof; and a second extract using water at elevated temperature. Both extractions are performed at ambient pressure.

However, contrary to the prior art above the present inventors achieve oxidation of the whole tea solids without any pH modification or catalyst addition but solely through a combination of high pressure processing and an optimised oxygen transfer rate. That is significant as the incomplete removal of pH modifying substances and catalysts cause contamination.

It is an object of the present invention to provide a method for making a cold water soluble black tea product from a whole black tea infusion.

SUMMARY OF THE INVENTION

In a first aspect the invention can be said in broad terms to relate to a method for making a cold water soluble black tea extract, the method comprising the steps of (a) extracting tea solids from black tea leaves using an extraction liquid to provide a whole tea extract; (b) oxidising said whole tea extract under superatmospheric pressure and at a temperature above 60° C. to provide a cold water soluble liquor; (c) cooling said cold water soluble liquor to precipitate any residual cold water insoluble material; and (d) separating said residual cold water insoluble material from said cold water soluble liquor to give the cold water soluble black tea extract.

In a second aspect the invention can be said in broad terms to relate to a method for making a cold water soluble black tea powder, the method comprising the steps of (a) extracting tea solids from black tea leaves using an extraction liquid to provide a whole tea extract; (b) oxidising said whole tea extract under superatmospheric pressure and at a temperature above 60° C. to provide a cold water soluble liquor; (c) cooling said cold water soluble liquor to precipitate any residual cold water insoluble material; (d) separating said residual cold water insoluble material from said cold water soluble liquor to give the cold water soluble black tea extract; and (e) drying the cold water soluble black tea extract to form the cold water soluble black tea powder.

Preferably the oxygen transfer rate is between 8 and 50 $hr^{-1}$, more preferably between 15 and 35 $hr^{-1}$. The oxygen can be provided as a component of air.

Beverages made from these tea powders have good clarity and favourable flavour and colour.

"Tea" for the purposes of the present invention means leaf material from *Camellia sinensis* var. *sinensis* or *Camellia sinensis* var. *assamica*. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

DETAILED DESCRIPTION OF THE INVENTION

The invention relates to a method for making a cold water soluble black tea extract or powder. The method involves extracting tea solids from black tea leaves using an extraction liquid to provide a whole tea extract and oxidising the whole tea extract, as opposed to solely the insoluble cream fraction or the soluble decreamed fraction, under superatmospheric pressure and at a temperature above 60° C. This gives a cold water soluble liquor. Further method steps involve cooling the cold water soluble liquor to precipitate any residual cold water insoluble material, and separating the residual cold water insoluble material from the cold water soluble liquor to give the cold water soluble black tea extract.

The inventors have found that the temperature and pressure are preferably those at which distilled water would have at equilibrium a maximum capacity for dissolved oxygen of at least 0.5 grams per liter. It is also preferred the oxygen transfer rate is such that the tea solids are oxidised in the absence of a catalyst or any pH modification step.

It will be appreciated by those skilled in the art that, at the temperatures indicated above, the cold water insoluble tea solids will be generally soluble, such that where the method is applied to an aqueous extract prepared from black tea leaves, the aqueous mixture will be substantially a solution. The aqueous mixture will conveniently be an aqueous whole black tea extract, comprising cold water soluble tea materials as well as the insoluble materials.

The maximum obtainable concentration of dissolved oxygen in distilled water under given conditions of temperature and pressure can be readily determined by reference to standard texts. Thus Perry's Chemical Engineering Handbook (Perry & Green 1984, Sixth Edition p.3 103, McGraw Hill) gives the values for maximum solubility of oxygen in water at elevated pressure for temperatures up to 100° C. For temperatures in excess of 100° C., reference may be made to the paper by Pray et al., (1952 Industrial and Engineering Chemistry 44, 1146–1151). The maximum dissolved oxygen concentration obtainable at equilibrium under the same conditions in aqueous mixtures comprising cold water insoluble tea solids (such as are the subject of the process of the present invention) may vary somewhat from those values obtainable in distilled water. In particular the presence of other solutes in the aqueous phase, competing with oxygen molecules for hydration by water molecules, will tend to decrease the solubility of oxygen in the aqueous phase. However, this is unlikely to cause a large reduction in oxygen solubility in the conditions of interest. The actual concentration of dissolved oxygen in the aqueous mixture cannot readily be determined—under the conditions of the process, standard methods of determining oxygen concentration (e.g. by the use of an oxygen electrode) are not feasible.

The conditions employed in the method defined above are more extreme than those conventionally applied in the prior art and result in a far greater maximum obtainable dissolved oxygen concentration for the aqueous mixture than hitherto. In general it would be preferred to avoid such conditions because of the energy costs in achieving the same.

However, the present inventors have found that such processing when applied to black tea extracts, largely solubilises the cold water insoluble materials present in the mixture, and has a highly desirable effect on the colour of mixture, which becomes much darker (i.e. less luminous) and more highly red coloured, than is generally achievable in conventional processes.

The preferred oxidant is oxygen. Use of high partial pressures of oxygen serves to increase the maximum capacity of the aqueous mixture for dissolved oxygen. Preferably conditions are such as to create a maximum capacity for dissolved oxygen (in distilled water) at equilibrium in the range of 0.5 to 5 grams per liter, more preferably 0.5 to 1.5 grams per liter, and most preferably 0.7 to 1.0 grams per liter.

Preferably conditions are arranged (e.g. by the use of high partial pressures of oxygen and by the use of agitation) such that the actual concentration of dissolved oxygen in the aqueous mixture approaches the maximum obtainable at equilibrium under the selected conditions. However, it is quite possible that the system never attains equilibrium (e.g. because dissolved oxygen is consumed in oxidation reactions), such that the maximum obtainable equilibrium concentration of dissolved oxygen in the aqueous mixture is not reached.

Those skilled in the art will appreciate that other oxygen-containing or generating substances may be used to give an equivalent oxygen solubility in the aqueous mixture. For example, a higher partial pressure of air or oxygen-enriched air may be used, or (less preferably) aqueous solutions of hydrogen peroxide may be added. Alternatively ozone, or other oxidising gas, may be used so as to give an "oxidising power" in the aqueous mixture equivalent to that generated by a maximum oxygen solubility of at least 0.5 grams per liter.

It will be apparent from the foregoing, and those skilled in the art would appreciate, that increased temperature in a closed reaction system will increase pressure, and so tend to increase the amount of oxygen dissolving in the aqueous mixture. Under certain circumstances, it may be preferred to use an "open" system, whereby the concentration of a gaseous oxidising agent is held constant, whilst being passed through the reaction vessel at a given flow rate. Alternatively, the gaseous oxidising agent may be advantageously introduced in pulses.

The reaction may be performed as a batch process (where the reaction vessel may be, for example, a stirred tank) or may be a continuous process (performed, for example, in a stirred tank or a conduit, such as a pipe).

The method of the invention may successfully be performed on aqueous mixtures comprising suspensions of cold water insoluble tea solids in the range 0.3–20.0% (w/v). Conveniently a concentration in the range 3–10% (w/v) may be selected.

In relation to the processing of cold water insoluble black tea solids, in the examples that follow, a 3% (w/v) suspension of tea solids was prepared in deionised water, starting from a freeze-dried powder prepared from an aqueous tea extract. This arrangement allowed for optimum reproducibility of experimental conditions and had the advantage of simplicity. In practice, on an industrial scale, it is envisaged that the aqueous mixture used in the process of the invention will be an aqueous tea extract, without having gone through an initial freeze-drying stage. The aqueous extract may conveniently be concentrated prior to processing according to the method of the invention.

Aqueous black tea extracts are naturally acidic, typically having a pH in the range 4.0–5.0. In conventional processes, efficient solubilisation of cold water insoluble materials (performed without application of high pressures) requires the addition of a catalyst and/or the addition of a strong base, such as sodium hydroxide, to increase the pH to 8–11, to allow oxidation of the cold water insoluble materials. As oxidation proceeds the pH falls. However, the fall in pH is usually insufficient to return the mixture to its native pH range, such that acid is required to be added after the oxidation stage in order to obtain a more natural product.

The present inventors have found that use of an oxidising agent at high pressure and temperature allows a considerable degree of solubilisation to occur at lower pH than is generally used in conventional processes, avoiding the requirement for the addition of a strong base to achieve alkaline conditions. For example, solubilisation of black tea cold water insoluble solids can be achieved using a pH of 5.0 to 7.0, more particularly 5.5 to 6.5. This modestly increased pH can satisfactorily be achieved by the addition to the aqueous mixture of a salt of a weak acid, such as trisodium citrate. Again, as the pH falls during oxidation/solubilisation of the cold water insoluble materials, the final pH of the aqueous solution is very close to the pH of the native material, giving a naturally acidic product.

If desired, pressures and temperatures towards the lower end of the ranges defined above can be selected, together with a correspondingly more alkaline pH, without loss of solubilising effect. Mildly alkaline pHs (e.g. pH 8.0) may be achieved by the addition of a strong base, such as NaOH, to the aqueous mixture. Conversely, higher pressures and temperatures can be used with native pHs. There would not appear to be any theoretical maximum pressure, although clearly there are practical constraints to consider (e.g. strength of reaction vessel etc.).

The preferred temperature at which the process is performed varies slightly depending on the substrate. The preferred temperature for processing either black tea solids is above 100° C., preferably 100 to 140° C., more particularly 110 to 120° C. The preferred oxygen partial pressure is 0.5–2.0 MPa.

The time taken to complete the reaction will of course depend in part on the reaction conditions used and the degree of solubilisation required. Generally, more extreme conditions (higher temperature/pressure) will result in quicker attainment of a desired end-point. Typically, the reaction will take between 10 minutes and 1 hour, more normally 10 to 30 minutes. The reaction time may be shortened by the incorporation of other oxidising agents (e.g. ozone, $H_2O_2$) into the aqueous mixture, either in a single batch or incrementally.

If desired, any residual cold water insoluble material may be removed at the end of the process. Typically this will be performed by cooling the mixture to precipitate the cold water insoluble material, followed by centrifugation (which step is generally known as "polishing"). Finally, the resulting solution may optionally be concentrated and dried, typically by spray drying or freeze-drying, to give a cold water soluble instant tea powder. Such a powder can be used to make ready to drink tea products.

The invention including some preferred embodiments thereof will now be described with reference to the following examples.

EXAMPLES

Example 1

Making a Cold Water Soluble Tea Extract from a Black Tea Extract

A tea extract was prepared from a black tea in the following manner. Deionised water and black tea, at a water to leaf ratio of 10:1, were contacted in a 7 stage counter-current continuous extractor, wherein the black tea had a residence time of approximately 10 minutes and the deionised water had a residence time of approximately 15 minutes. The extraction was carried out at 85° C. (The deionised water extract of tea solids is referred to as an infusion of tea solids.) The infusion was then freeze-dried to give a powder.

A solution containing 3%(w/v) of extracted tea solids was prepared in de-ionised water, using the freeze-dried powder prepared above. The solution was added to a PARR (TM) bench-top mini reactor model number 4562, which is capable of safely operating under high pressures and of maintaining a desired temperature. The pH of the solution of tea solids was modified as required using trisodium citrate dihydrate to achieve pH 6.0, or sodium hydroxide to achieve pH 8.0. The solution of tea solids was then placed into the PARR (TM) reactor, the reactor sealed and the vessel was pressurised with oxygen to between 1.9 and 2.2 MPa gauge. The vessel was then heated to the required temperature between 70° and 120° C. using an electric mantle heater. As a result of heating, the oxygen partial pressure within the reactor increased to between 2.1 and 2.7 MPa gauge at the reaction temperature, which would give a maximum oxygen solubility at equilibrium of at least 0.5 grams per liter in distilled water. The reaction was allowed to proceed for 15 to 30 minutes, after which time the reactor was cooled to between 80° and 90° C., the pressure within the reactor was released and the solution of tea solids collected.

Treated samples were then cooled to 5° C. and held at that temperature for a suitable period of time to precipitate the residual cold water insoluble materials which were then separated from the cold water soluble materials by centrifugation. The resulting supernatant phase was then dried giving a powder which was instantly soluble in water and was found to have the organoleptic properties desirable for an instant tea powder for use in beverages, especially those with an acidic pH. The amount of cold water insoluble materials present in the aqueous mixture can be reduced under optimal conditions, by up to 85%.

The colour assessment of the supernatant from the centrifugation process was made using a MINOLTA CT-310 (TM) instrument using illuminant C, a 2° observer, a 1 cm pathlength transmission cell and the results are based on the CIE 1976 L*a*b colour space (see International Standards Organisation [ISO] standards 7724-1, 7724-2 and 7724-3). All samples for colour analysis were measured at pH 3.7 and a solids concentration of 0.32% (w/v). The results for reactions performed at three differing pHs are shown in Tables 1, 2 and 3 below.

TABLE 1

Effect of heating a black tea infusion of 3% (w/v) solids in the presence or absence of an increased maximum $O_2$ solubility at the native pH, on the measured colour properties at pH 3.7 and 0.32% (w/v)

| Temp (° C.) | Maximum dissolved $O_2$ conc. $(g \cdot l^{-1})^\dagger$ | L* | a* | b* |
| --- | --- | --- | --- | --- |
| 70 | OFN | 85.9 | 1.6 | 53.1 |
| 70 | 0.52 | 82.7 | 4.0 | 59.3 |
| 100 | OFN | 84.1 | 3.1 | 53.4 |
| 100 | 0.66 | 80.7 | 5.7 | 58.6 |

TABLE 2

Effect of heating a black tea infusion of 3% (w/v) solids in the presence or absence of an increased maximum $O_2$ solubility at pH 6.0* on the measured colour properties at pH 3.7 and 0.32% (w/v).

| Temp (° C.) | Maximum dissolved $O_2$ conc. $(g \cdot l^{-1})^\dagger$ | L* | a* | b* |
| --- | --- | --- | --- | --- |
| 70 | OFN | 84.2 | 3.1 | 53.0 |
| 70 | 0.52 | 78.0 | 7.4 | 62.9 |
| 100 | OFN | 83.0 | 4.1 | 52.7 |
| 100 | 0.66 | 71.8 | 12.5 | 66.7 |

*using trisodium citrate dihydrate to modify the pH of the tea infusion prior to heating

TABLE 3

The effect of heating a black tea infusion of 3% (w/v) solids in the presence and absence of an increased maximum oxygen solubility at pH 8.0* on the measured colour properties at pH 3.7 and 0.32% (w/v).

| Temp (° C.) | Maximum dissolved $O_2$ conc. $(g \cdot l^{-1})$† | L* | a* | b* |
|---|---|---|---|---|
| 70 | OFN | 60.5 | 23.2 | 58.6 |
| 70 | 0.52 | 56.7 | 27.1 | 73.8 |
| 100 | OFN | 54.9 | 24.0 | 74.3 |
| 100 | 0.66 | 47.3 | 30.7 | 71.4 |

*using trisodium citrate dihydrate to modify the pH of the tea infusion prior to heating
†For Tables 1 to 3: Theoretical determination based on data from Perry's Chemical Engineering Handbook. OFN represents the case where oxygen free nitrogen was used to flush air out of the head space of the vessel prior to heating. The vessel was not pressurised prior to heating in these cases.

Those skilled in the art would appreciate that the absolute pressure used in a given system will depend on the oxidising power of the gaseous oxidising agent used. Where the oxidising agent is used as a source of oxygen, this will depend on the partial pressure of oxygen in the gas. For example, to achieve a maximum oxygen solubility of 0.7 g/l in the system detailed here requires: oxygen gas at partial pressures of 1.9 to 2.1 MPa gauge, whilst use of air would require partial pressures of air at 9.5 to 10.5 MPa gauge, for temperatures in the range 70 to 100° C.

Example 2

Making a Cold Water Soluble Tea Extract from Unfermented Dhool

A suspension (5.0%, w/w tea solids) of unfermented dhool from Kenyan seedling tea was fermented for 75 minutes using compressed air in an agitated vessel at 25° C. At 75 minutes the tea leaf slurry was filtered to remove coarse leaf solids and the deleafed slurry was sealed in a pressure vessel. An oxygen supply was injected to a final pressure of 320 lb/in² (2.2 MPa) gauge. The liquor was then heated in the pressure vessel to 120° C., giving a pressure of 400 p.s.i. (2.7 MPa) gauge and held at this temperature and pressure for 30 minutes. The liquor was cooled to 4° C. to precipitate any residual cold water insoluble material, centrifuged at 11,500×g for 20 minutes to remove the precipitate, and the concentration and colour of the cold-soluble solids in the liquor measured. Liquor colour was measured as tristimulus values (CIE Lab 1976 colour space) using a MINOLTA CT310 (TM) meter. Samples for analysis were adjusted to pH 3.7 and to 0.32% (w/v) solids.

An identical experiment was carried out as above except that no pressurised oxygen was injected into the liquor before heating. The darkening in colour of the treated samples is shown relative to the untreated control in Table 4 below.

Thermal treatment in the absence of added oxygen caused some darkening of the liquor and a loss of the tristimulus yellow component (b*). However, the reduction in luminosity and increase in liquor redness in the presence of added oxygen were unexpectedly large.

TABLE 4

Colour comparison of oxidised and non oxidised black tea samples

| SAMPLE | L* | a* | b* |
|---|---|---|---|
| Untreated control | 88 | 4 | 78 |
| Heated, oxidised sample (120° C. + $O_2$) | 45 | 28 | 70 |
| Heated sample (120° C.) | 80 | 5 | 8 |

L* a* b* values measured at pH 3.7 and with solution adjusted to 0.32% (w/v) solids.

The experiment was repeated substantially as described above, but using a temperature of 125° C. Samples were subjected to relatively low (0.7 MPa gauge) or very high (2.5 MPa gauge) partial pressures of oxygen, for 10 or 30 minutes. The colour characteristics of the resulting samples were analysed as described above. The results are shown in Table 5 below.

TABLE 5

Colour comparison of oxidised and non oxidised black tea samples

| SAMPLE TREATMENT | L* | a* | b* |
|---|---|---|---|
| 125° C., 2.5 MPa 10 minutes | 50 | 27.5 | 62 |
| 125° C., 2.5 MPa 30 minutes | 27 | 37.5 | 37 |
| 125° C., 0.7 MPa 30 minutes | 66.5 | 28 | 67 |

Relative to values in Table 4 for the control sample, and the heated sample, it can be seen that treatment with moderately increased oxygen partial pressures (0.7 MPa) for 30 minutes at 125° C. can cause a notable increase in a* value and a notable reduction in b* value, causing changes in these characteristics very similar to those observed in the heated oxidised sample in Table 4, but did not reduce the luminosity (L*) of the sample to such a great extent.

Treatment for just 10 minutes at 125° C. with 2.5 MPa partial pressure of oxygen gave changes in all three colour characteristics generally similar to those seen in the heated, oxidised sample in Table 4. Thus increased temperature would appear to allow for shorter reaction times, which is generally as one would expect. However, treatment under these conditions for a longer period (30 minutes) causes a further (relatively) small increase in a* value and dramatic decreases in L* and b* values.

Example 3

Making a Cold Water Soluble Tea Powder

A preferred method for making a cold water soluble tea powder involves preparing an extract of broken mixed fannings (BMF) at concentrations up to and including 6% (W/v) from a freeze dried extract, pressurising the suspension of tea solids to 5.4 MPa with air, heating the pressurised suspension with gentle. stirring to 120° C. as a result of which the pressure increased to 6.8 MPa, increasing the stirring speed to achieve the desired oxygen transfer coefficient and maintaining these conditions for between 20 to 60 minutes. After this time the system is cooled and the tea solids recovered. This process solubilises the insolubles normally present, to the extent that no subsequent centrifugal separation of insolubles is required and hence the yield of the process is extremely high being typically in the range 95–98%. Powders prepared from this process are soluble in cold water, give clear, bright solutions with a characteristic tea appearance and have ash levels directly comparable to tea extracts. This process is also effective with pH modification although this is not necessarily to achieve the desired effect.

It is necessary to identify the critical range of oxygen transfer values in order to provide good colour generation whilst ensuring the desired extent of solubilisation is achieved. The preferred range is between 8 and 50 hr$^{-1}$, more preferably between 15 and 35 h$^{-1}$.

TABLE 6

The colours of powders produced by the method as measured by the HUNTER ULTRASCAN II at 0.32% solids and pH 3.7

| pH | KLa (hr-1) | L | a |
|---|---|---|---|
| 6.0 | 21.0 | 47 | 30 |
| 5.5 | 21.0 | 47 | 30 |
| Native | 21.0 | 41 | 34 |
| Native | 48.7 | 55 | 29 |

Beverages made from the tea powders produced by this method were found to good clarity, colour, flavour and acid stability.

What is claimed is:

1. A method for making a cold water soluble black tea extract, the method comprising the steps of (a) extracting tea solids from black tea leaves using an extraction liquid to provide a whole tea extract; (b) oxidising said whole tea extract under superatmospheric pressure and at a temperature above 60° C. to provide a cold water soluble liquor; (c) cooling said cold water soluble liquor to precipitate any residual cold water insoluble material; and (d) separating said residual cold water insoluble material from said cold water soluble liquor to give the cold water soluble black tea extract.

2. The method according to claim 1, wherein said temperature and pressure are those at which distilled water would have at equilibrium a maximum capacity for dissolved oxygen of at least 0.5 grams per liter.

3. The method according to claim 1, wherein the method is conducted with an oxygen transfer rate that is between 8 and 50 hr$^{-1}$.

4. The method according to claim 3, wherein the oxygen transfer rate is between 15 and 35 hr$^{-1}$.

5. The method according to claim 1, wherein the dissolved oxygen concentration is 0.5 to 5.0 grams per liter.

6. The method according to claim 1, wherein oxygen is present at a partial pressure of 0.5 to 2.0 MPa.

7. The method according to claim 1, wherein tea solids are present at the start of the process are at a concentration of 0.3 to 20.0% (w/v).

8. The method according to claim 1, wherein the temperature is 100 to 120° C.

9. The method according to claim 1, wherein the pH of the black tea extract is initially 4.0 to 11.0.

10. A method according to claim 1, further comprising drying the cold water soluble tea extract to form a cold water soluble black tea powder.

11. A method for making a cold water soluble black tea powder comprising the steps of: (a) extracting tea solids from black tea leaves using an extraction liquid to provide a whole tea extract; (b) oxidising said whole tea extract under superatmospheric pressure and at a temperature above 60° C. to provide a cold water soluble liquor; (c) cooling said cold water soluble liquor to precipitate any residual cold water insoluble material; (d) separating said residual cold water insoluble material from said cold water soluble liquor to give the cold water soluble black tea extract; and (e) drying the cold water soluble black tea extract to form the cold water soluble black tea powder.

* * * * *